(12) United States Patent
Cho (10) Patent No.: US 8,277,526 B2
(45) Date of Patent: Oct. 2, 2012

(54) FILTER DUST COLLECTOR

(76) Inventor: Yong-Lae Cho, Incheon (KR)

( * ) Notice: Subject to any disclaimer, the term of this patent is extended or adjusted under 35 U.S.C. 154(b) by 317 days.

(21) Appl. No.: 12/745,813
(22) PCT Filed: May 29, 2008
(86) PCT No.: PCT/KR2008/003026
§ 371 (c)(1),
(2), (4) Date: Jun. 2, 2010
(87) PCT Pub. No.: WO2009/072707
PCT Pub. Date: Jun. 11, 2009

(65) Prior Publication Data
US 2010/0251676 A1 Oct. 7, 2010

(30) Foreign Application Priority Data

Dec. 3, 2007 (KR) .......................... 10-2007-0124565
May 14, 2008 (KR) .......................... 10-2008-0044701

(51) Int. Cl.
*B01D 46/04* (2006.01)
(52) U.S. Cl. ................. 55/294; 55/295; 55/296; 55/302
(58) Field of Classification Search ................. 55/282, 55/287, 291–305, 317, 341.1, 341.2, 361.373, 55/374–376, 378, 379, 418, 419, 468, 476, 55/DIG. 26
See application file for complete search history.

(56) References Cited

FOREIGN PATENT DOCUMENTS

| JP | 2000-334238 | 5/2000 |
| KR | 10-2003-0032502 | 4/2003 |
| WO | WO 3055576 A1 * | 7/2003 |

* cited by examiner

*Primary Examiner* — Duane Smith
*Assistant Examiner* — Sonji Turner
(74) *Attorney, Agent, or Firm* — IPLA P.A.; James E. Bame

(57) ABSTRACT

A filter dust collector is disclosed. The filter dust collector includes a housing, filter cloths fixed to an inside of the housing, a filter body part disposed inside the housing and having filter insertion holes, a compressed air supply part coupled to peripheries of the filter insertion holes, a transfer part connected to the filter body part to move the filter body part and the compressed air supply part in a longitudinal direction, a duct suction port formed on a side surface of the housing to suck air to be filtered, a supply port formed on a side surface of the housing to discharge filtered air, and a dust discharge port formed on a side surface of the housing, wherein the filter cloths are positioned at the filter insertion holes, the filter body part and the compressed air supply part move in the longitudinal direction, and the compressed air supply part sprays compressed air to the filter cloths.

9 Claims, 8 Drawing Sheets

FILTER DUST COLLECTOR

TECHNICAL FIELD

The present invention relates to a filter dust collector.

BACKGROUND ART

Generally, a dust collector is an apparatus which collects and removes gaseous or liquid fine particles floating in gas. In the first place, the dust collector was used to remove fine particles of ash contained in flue gas of a boiler. Recently, the dust collector is mounted on many chimneys of a factory to prevent sooty smoke and other fine particles from coming out of the chimneys. The fine particles have a size of about 1 mm to 1 μm. Relatively large particles can be easily removed, but it is difficult to remove fine particles which may have a bad influence on a human body. Dust collecting methods include a method using gravity, a filtering method using filter media, a method using inertia or a centrifugal force, a method using sound waves, a cleaning method and the like, and may be largely classified into mechanical methods and electrical methods. The mechanical methods include a dry method and a wet method.

The dust collector which filters contaminated gas to clean the gas is widely used in order to remove fine particles of ash in sooty smoke and also to improve the environment in a factory or a work place equipped with various facilities.

Among the dust collectors, a filter dust collector is an apparatus for separating particles such as dust from gas by passing the gas containing the particles through various filter media and is referred to as a filter dust collecting apparatus. The filter dust collector is one of air pollution prevention apparatuses which filter various particles in air causing air pollution or noxious particles contained in discharge gas of a factory or the like, or prevent such particles from being discharged. As for a filtering method, there are a surface filtering method in which dust is attached to the surface of a filter medium such as thin paper or fibers and an inner filtering method in which dust is collected in a fibrous layer of a bag filter which is a filter cloth formed in a bag shape or a flat plate shape using a filter medium having a thick layer such as glass fibers or cotton fibers.

In the filter dust collector, dust is separated only by a filtering effect of the filter medium in an initial operation, but a dust layer, which is accumulated on the surface of the filter medium as time goes by, is closely filled in holes of the filter medium, thereby increasing removal efficiency. Generally, in a case of dust having a size of 1.0 μm or more, it provides efficiency of 99% or more. This apparatus collects dust on the principles such as impact, direct interception, surface deposition, and diffusion.

However, if the dust accumulated on the surface of the filter medium is excessively thick, an amount of air passing through the filter medium is reduced and the holes of the filter medium may be clogged with dust. In this case, since the filter medium cannot be used, replacement should be performed. Accordingly, after the filter medium is used for some time, a removal operation should be performed to remove the dust accumulated on the surface of the filter medium. Removal methods include an intermittent method and a consecutive method. The intermittent method is a method for removing dust by dividing a dust collecting room into three or four portions and intercepting flow of gas only at a portion where the pressure loss reaches a predetermined value. The consecutive method is a method for removing dust by continuously collecting dust to sequentially remove dust attached to the filter medium without division of the dust collecting room or interception of gas.

The filter dust collectors which perform a removal operation include a vibration type filter dust collector, a backflow type filter dust collector, and an impact ejection type filter dust collector. The vibration type filter dust collector uses sound waves or vibrates vertically and laterally, and the counter air flow type filter dust collector supplies compressed air in a reverse direction while filtration is performed to remove dust attached to the inside of the filter cloth. The impact ejection type filter dust collector supplies compressed air inside the filter cloth in order to remove dust attached to the outside of the filter cloth, thereby instantaneously removing the dust. A dual impact ejection type filter dust collector is widely used.

However, according to the conventional impact ejection type filter dust collector, it is necessary to eject high-pressure compressed air to the filter cloth to efficiently remove the dust accumulated to the filter cloth. In this case, very large noise is generated to damage the work environment. Further, when the compressed air is ejected to the filter cloth to remove dust of the filter cloth, the amount of dust entering in the filter cloth through attraction holes is reduced since the direction of the compressed air entering into the dust collector is opposite to the dust injection direction. Consequently, a large-capacity pump should be used to make the amount of dust entering in the filter cloth through attraction holes equal to the amount when the compressed air is not supplied, thereby increasing the manufacturing costs. Meanwhile, the dust collecting operation is stopped and the removal operation is performed to prevent backflow of dust coming through the attraction holes, but in this case, air purification performance is reduced.

DISCLOSURE OF INVENTION

Technical Problem

Therefore, the present invention has been made in view of the above problems, and it is an object of the present invention to provide a filter dust collector capable of efficiently removing dust accumulated on filter cloths without spraying high-pressure compressed air.

Further, it is another object of the present invention to provide a filter dust collector in which an amount of dust supplied to the filter cloths is not reduced by the compressed air.

Technical Solution

In accordance with an aspect of the present invention, the above and other objects can be accomplished by the provision of a filter dust collector comprising: i) a housing part which includes a housing, a supply port formed at an upper portion of the housing, a duct suction port formed on a side surface of the housing to suck air to be filtered, and a dust discharge port formed at a lower portion of the housing and having a dust discharge valve; ii) a filter body part which includes filter bodies formed inside the housing and having filter insertion holes, transfer fixing portions formed on edges of the filter bodies, and filters inserted into the filter insertion holes and having filter cloths; iii) a transfer part which includes transfer members coupled to the transfer fixing portions and transferred vertically, transfer shafts having transmission members rotatably coupled to the transfer members, driven shafts having driven support members coupled to the transfer members, and a transfer motor for rotating the transfer shafts; and iv) a compressed air supply part formed at peripheries of the filter insertion holes to spray compressed air.

The compressed air supply part may include compressed air supply lines formed at the peripheries of the filter insertion holes and having compressed air supply holes, and a compressed air supply source which supplies compressed air to the compressed air supply lines.

The filter dust collector may further include supply spray nozzles installed at the compressed air supply holes and having inclined spray portions to adjust a spray position of the compressed air.

The supply port may include a supply controller which is disposed inside the supply port to adjust a discharge amount of filtered air, and the supply controller may be rotated to adjust the discharge amount of air by hinge coupling.

The filter dust collector may further include a transfer detection sensor which is disposed inside the housing to detect vertical transfer of the filter bodies.

In accordance with another aspect of the present invention, there is provided a filter dust collector comprising: a housing; filter cloths fixed to an inside of the housing; a filter body part disposed inside the housing and having filter insertion holes; a compressed air supply part coupled to peripheries of the filter insertion holes; a transfer part connected to the filter body part to move the filter body part and the compressed air supply part in a longitudinal direction; a duct suction port formed on a side surface of the housing to suck air to be filtered; a supply port formed on a side surface of the housing to discharge filtered air; and a dust discharge port formed on a side surface of the housing, wherein the filter cloths are positioned at the filter insertion holes, the filter body part and the compressed air supply part move in the longitudinal direction, and the compressed air supply part sprays compressed air to the filter cloths.

The transfer part may include chains connected to the filter body part, transfer shafts connected to the chains, and a transfer motor which rotates the transfer shafts. The transfer part may include a cylinder fixing part formed on one surface of the filter body part and protruded toward an inner surface of the housing, and a transfer cylinder having one side fixed to the cylinder fixing part and the other side fixed to the inside of the housing to move the filter body part in a longitudinal direction.

The filter dust collector may further include a guide seating portion which is installed on the inner surface of the housing toward the other surface of the filter body part in the longitudinal direction, and a guide which is formed on the other surface of the filter body part to be protruded toward the inner surface of the housing and is seated on the guide seating portion to guide movement of the filter body part.

Advantageous Effects

In the filter dust collector according to the embodiment of the present invention, dust is removed by spraying compressed air to the filter cloths of the filters in which dust is accumulated while vertically transferring the filter body part. Accordingly, it is possible to improve removal efficiency and increase a filtration amount since there is no interference with flow of the filtered air. Further, since high-pressure compressed air is not sprayed, noise is reduced, and since there is no interference with filtration flow, it is possible to improve a filtration amount even without an increase in facilities, thereby offering an effect of reducing the manufacturing costs.

Further, the filter dust collector according to the embodiment of the present invention includes the filter bodies having a plurality of filter insertion holes into which a plurality of filters are inserted, the transfer part formed at the center of the filter body part to transfer the filter bodies, and the compressed air supply lines formed at the outer peripheries of the filter insertion holes of the filter bodies to spray the compressed air toward the filters. Accordingly, dust is removed by spraying compressed air to the filters on which dust is accumulated while vertically transferring the filter body part. As the compressed air is sprayed toward an outer portion with accumulated dust, it is possible to easily remove the dust without temporarily operating the compressed air with strong pressure due to excellent dust removal efficiency. Thus, it is possible to improve dust removal efficiency and also increase a life span by reducing impulses of the filters, thereby offering an effect of minimizing waste of resources by using the compressed air at a lower pressure.

Further, the filter dust collector according to the embodiment of the present invention removes dust by spraying the compressed air to the outside of the filters for collecting dust. Since the compressed air is supplied in the same direction as the direction of air flow in filtration to remove the dust, the dust is collected in the filters and can be removed without interference with air flow for the dust collector which discharges clean air. Since there is no increase in capacity due to reduction in air flow, it is possible to reduce cost of facilities. Also, it is possible to decrease a time period for which the use of the filters is stopped according to removal of dust, thereby offering effects of increasing processing capacity and reducing production costs.

Further, the filter dust collector according to the embodiment of the present invention includes a plurality of compressed air supply holes formed on the compressed air supply lines installed at the outer peripheries of the filter insertion holes of the filter bodies in the direction of the filters. The compressed air is supplied toward the filters and the compressed air supply lines are connected to the compressed air supply source at the outside of the housing to control the flow by the compressed air valve. As the flow of the compressed air is controlled by the compressed air valve according to the demands, an operator can control dust removal of the filters. Accordingly, there is an effect of increasing removal efficiency by sequentially removing the dust according to the demands.

Further, the filter dust collector according to the embodiment of the present invention includes the supply spray nozzles having the inclined spray portions formed in the compressed air supply holes of the compressed air supply lines to spray the compressed air toward the filters, thereby providing an effect of improving dust removal efficiency by increasing the spray pressure of the compressed air.

Further, according to the embodiment of the present invention, a plurality of filter dust collectors are formed by connecting supply ports for supplying filtered air at upper portions of the housings, each having the supply controller rotatably coupled to a supply hinge to control a supply amount. In a state of closing the supply controller of any one of the filter dust collectors with a lot of accumulated dust, the dust is pressed by the compressed air and is discharged through the dust discharge port. When the discharge of dust is finished, the supply port is opened to perform an operation of supplying filtered air, and a removal operation is performed in another one of the filter dust collectors with a lot of accumulated dust. Accordingly, the removal operation is conducted alternately in the filter dust collectors, thereby providing an effect of increasing dust removal efficiency.

BRIEF DESCRIPTION OF THE DRAWINGS

The above and other objects, features and other advantages of the present invention will be more clearly understood from the following detailed description taken in conjunction with the accompanying drawings, in which:

FIG. 6 illustrates an enlarged view of a portion indicated by a circle B as shown in

FIG. 5;

BEST MODE FOR CARRYING OUT THE INVENTION

Hereinafter, embodiments of the present invention will be described in detail with reference to the accompanying drawings to allow those skilled in the art to easily use the invention. However, the present invention may be embodied in various different forms and the following embodiments are not limited thereto. Throughout the specification, similar parts are designated by the same reference numerals.

Figure 1:
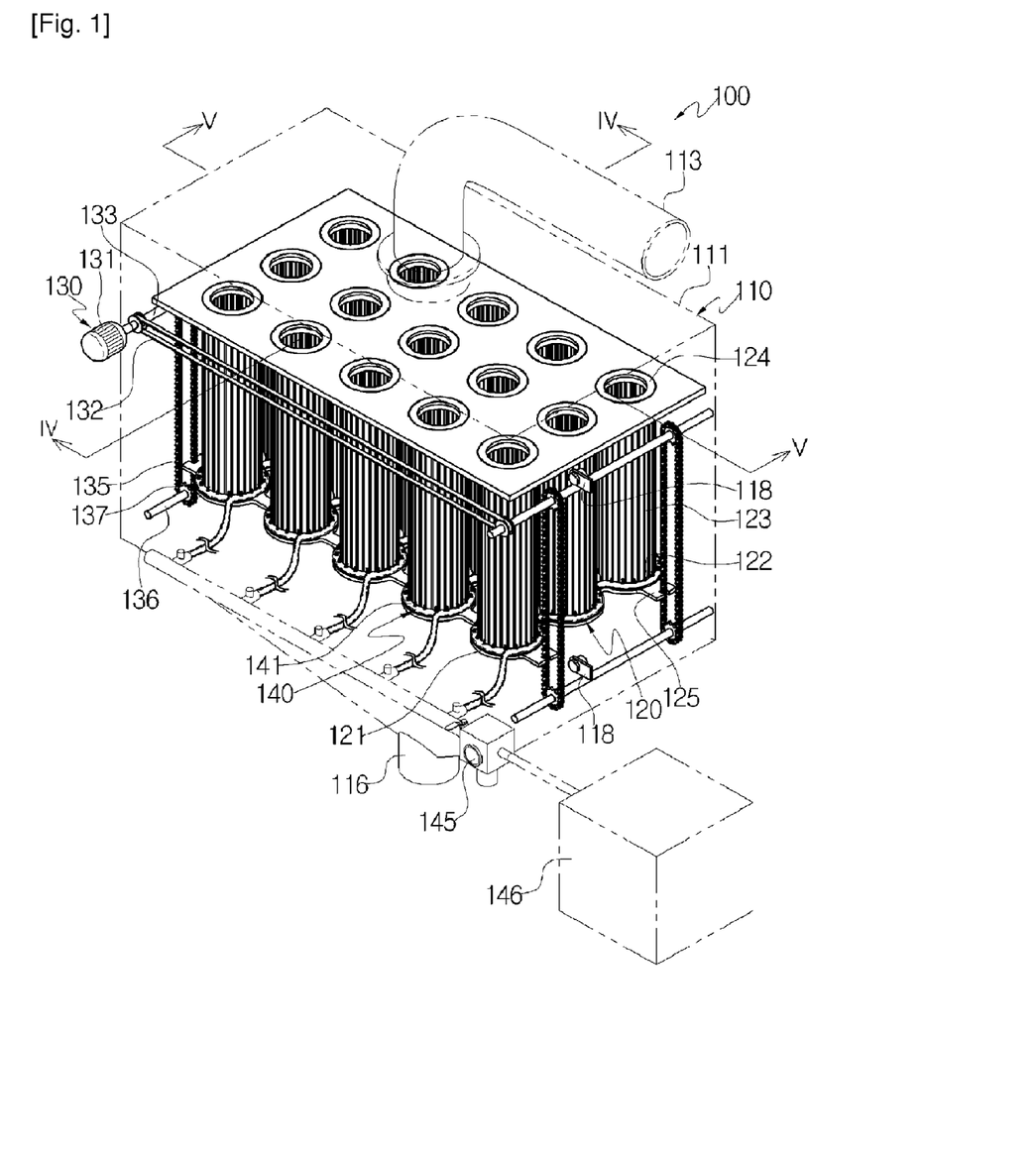
FIG. 1 illustrates a perspective view of a filter dust collector according to one embodiment of the present invention.
Figure 2:
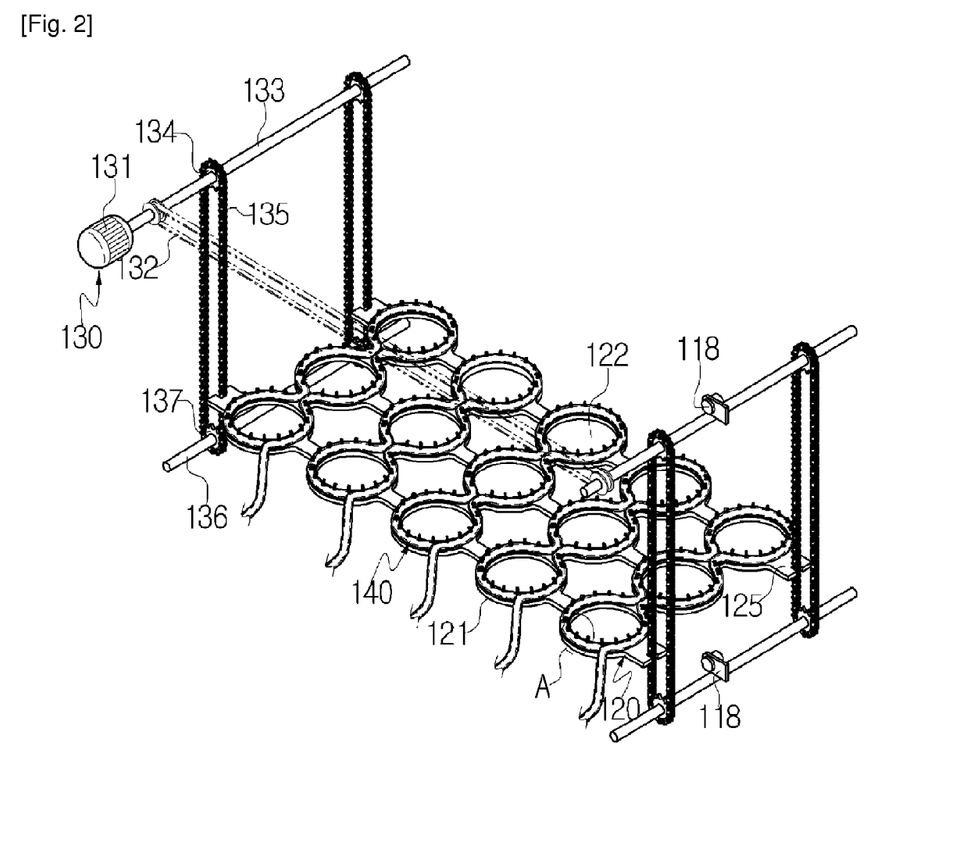
FIG. 2 illustrates a perspective view of a filter body part and a transfer part of FIG. 1.
Figure 3:
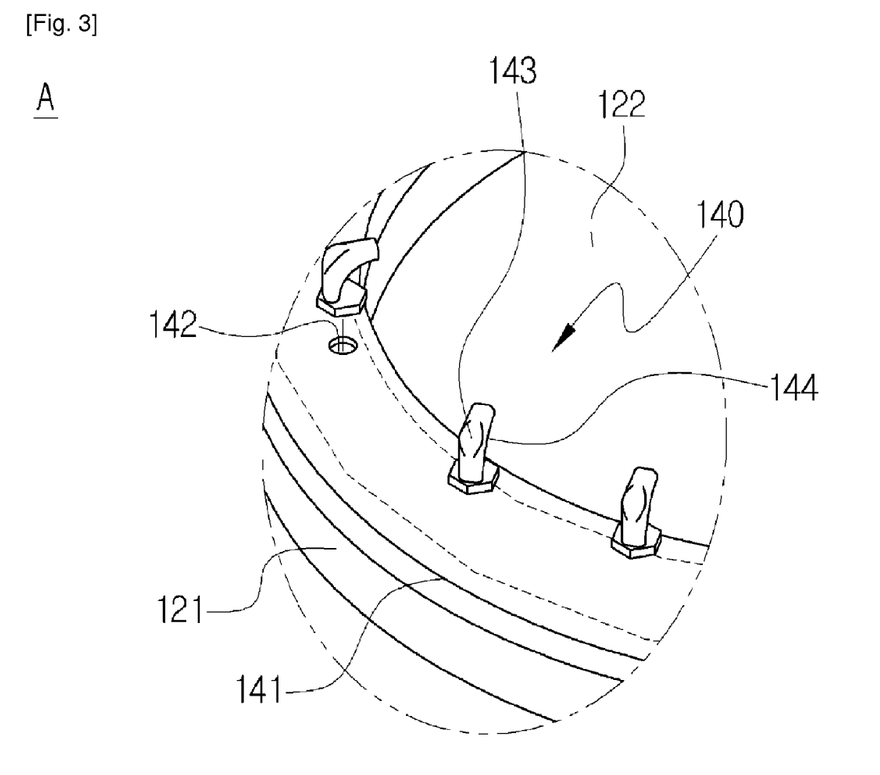
FIG. 3 illustrates an enlarged view of a portion indicated by a circle A as shown in FIG. 2.
Figure 4:
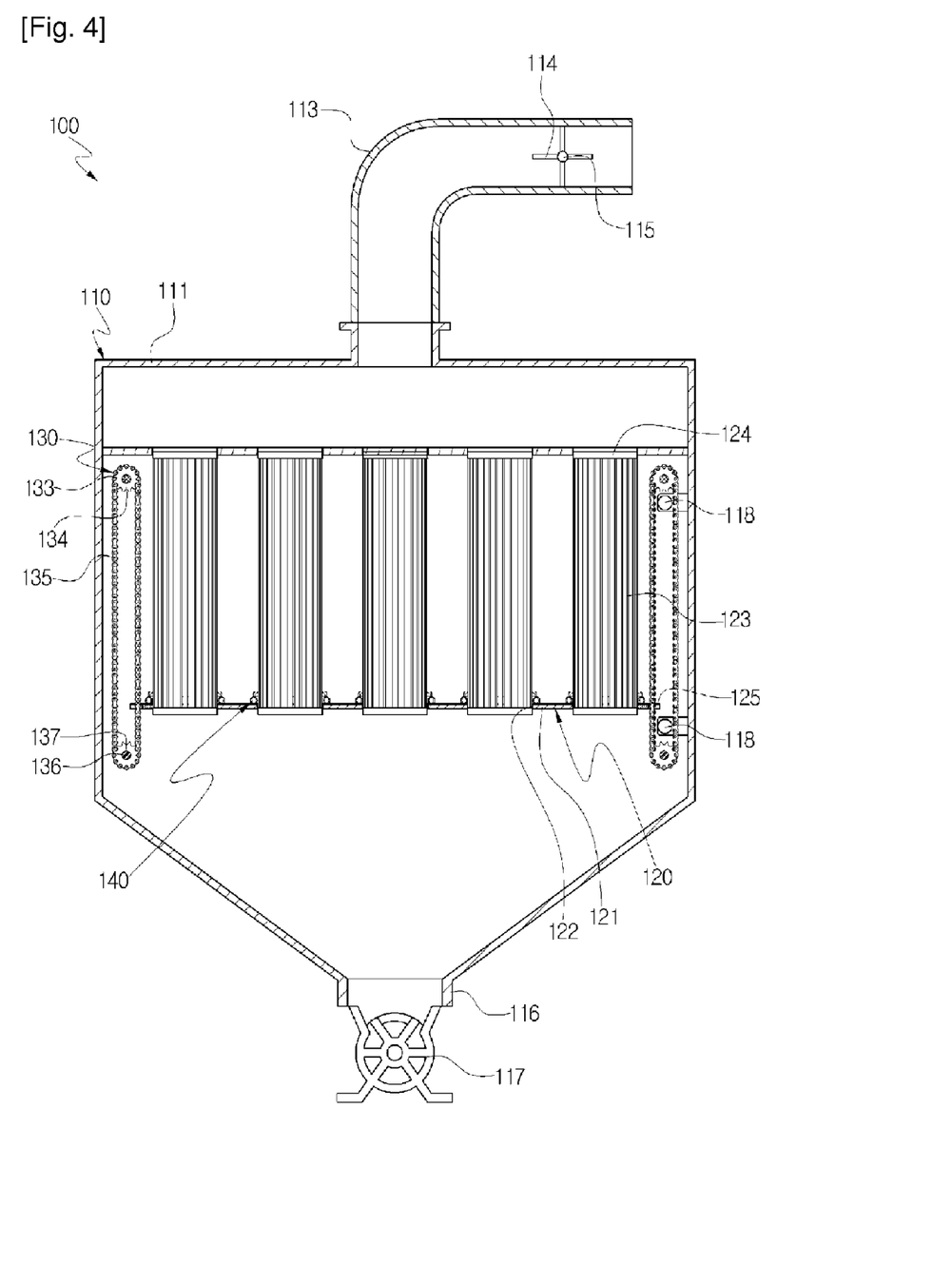
FIG. 4 illustrates a cross-sectional view taken along a line IV-IV of the filter dust collector shown in FIG. 1.
Figure 5:
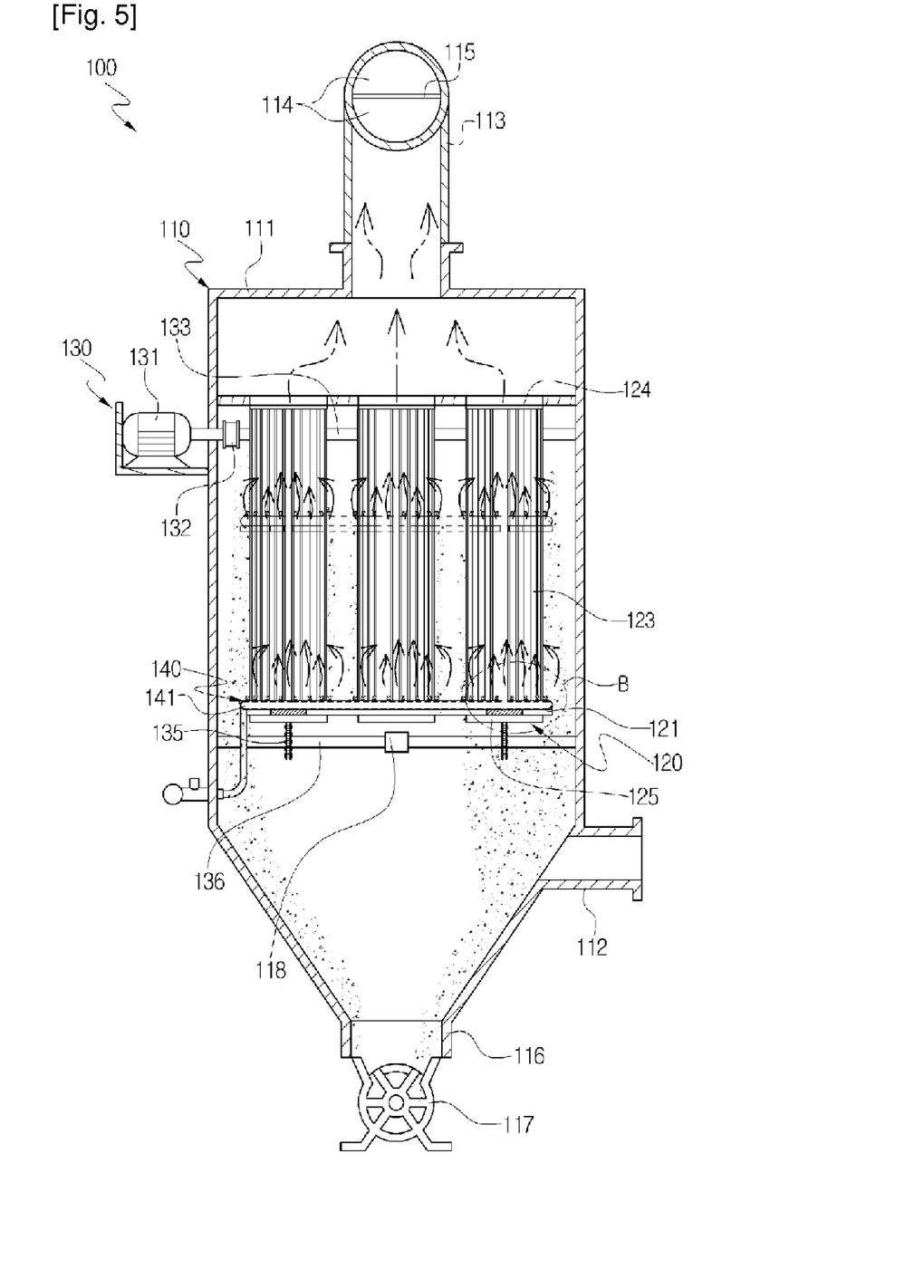
FIG. 5 illustrates a cross-sectional view taken along a line V-V of the filter dust collector shown in FIG. 1.
Figure 6:
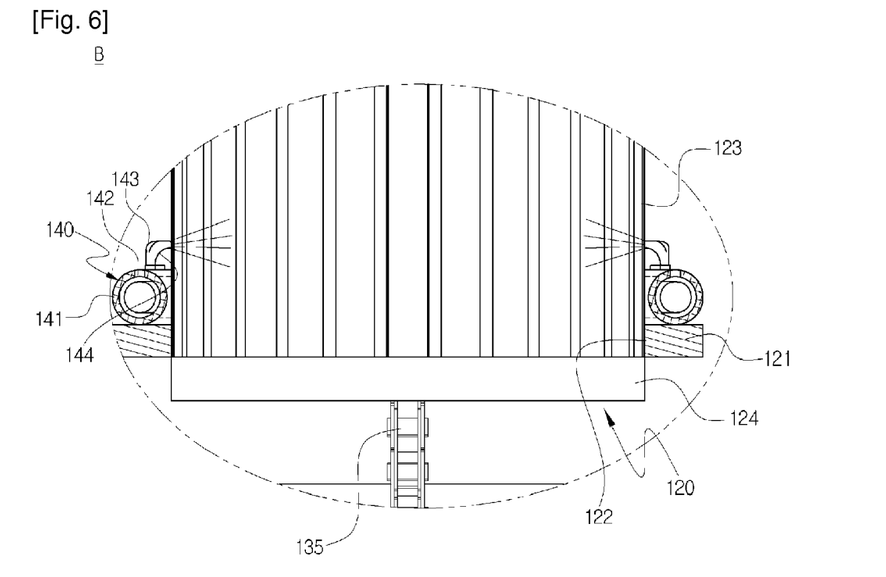

FIG. 1 illustrates a perspective view of a filter dust collector according to one embodiment of the present invention. FIG. 2 illustrates a perspective view of a filter body part and a transfer part of FIG. 1. FIG. 3 illustrates an enlarged view of a portion indicated by a circle A as shown in FIG. 2. FIG. 4 illustrates a cross-sectional view taken along a line IV-IV of the filter dust collector shown in FIG. 1. FIG. 5 illustrates a cross-sectional view taken along a line V-V of the filter dust collector shown in FIG. 1. FIG. 6 illustrates an enlarged view of a portion indicated by a circle B as shown in FIG. 5.

As shown in FIGS. 1 to 8, a filter dust collector 100 according to the embodiment of the present invention includes a housing part 110 having a housing 111 which filters air sucked from a duct suction port 112 and supplies the filtered air to a supply port 113 disposed at an upper portion thereof; a filter body part 120 having filter bodies 121 with filter insertion holes 122 for insertion of filters 124 which filter air supplied into the housing part 110, a transfer part 130 which vertically transfers the filter bodies 121 of the filter body part 120, and a compressed air supply part 140 which is installed at outer peripheries of the filter insertion holes 122 of the filter body part 120 to spray compressed air to the filters 124.

The housing part 110 includes the housing 111 having the duct suction port 112 formed at one side of a lower portion of the housing 111 to supply air mixed with dust, the supply port 113 which supplies the filtered air to an upper portion of the housing 111, a dust discharge port 116 which discharges dust to a lower portion of the housing 111, and a dust discharge valve 117 formed on the dust discharge port 116 to adjust the discharge amount of dust.

In this case, the housing part 110 includes a supply controller 114 which is coupled to a supply hinge 115 inside the supply port 113 to adjust the supply amount of the filtered air by rotation.

Further, the housing part 110 further includes a transfer detection sensor 118 which is disposed inside the housing 111 and detects vertical transfer of the filter bodies 121 to detect the position of the filter bodies 121 vertically transferred by the transfer part.

The filter body part 120 includes the filters 124 fixed to the inside of the housing 111 to supply air filtered by filter cloths 123 to the supply port 113, the filter bodies 121 having the filter insertion holes 122 for insertion of the filters 124, and transfer fixing portions 125 formed on the respective edges of the filter bodies 121. In this case, a guide 126 is protrudingly formed at one side of the filter bodies 121 and a guide seating portion 127 is formed inside the housing 111 toward the guide 126, thereby vertically transferring the filter bodies 121 while guiding one side of the filter bodies 121.

The transfer part 130 includes transfer members 135 which are coupled to the transfer fixing portions 125 disposed at the respective edges of the filter bodies 121 and are coupled to and interlocked with transfer shafts 133 through transmission members 134, a transfer motor 131 disposed at one side of the transfer shafts 133 to interlock with a rotation connection member 132, and driven shafts 136 having driven support members 137 supportedly coupled to lower portions of the transfer members 135. As the transfer shafts 133 are rotated by the operation of the transfer motor 131, the transfer members 135 coupled to the transmission members 134 are vertically transferred according to the rotation of the transfer shafts 133 while being supported by the driven support members 137 of the driven shafts 136, thereby vertically transferring the filter bodies 121 coupled to the transfer members 135.

In this case, the transfer part 130 may include a cylinder fixing part 139 formed at one side of the filter bodies 121 and a transfer cylinder 138 formed inside the housing 111 to be coupled to the cylinder fixing part 139. Accordingly, the filter bodies 121 may be vertically transferred by the operation of the transfer cylinder 138.

The compressed air supply part 140 includes compressed air supply lines 141 having a plurality of compressed air supply holes 142 formed at the outer peripheries of the filter insertion holes 122, and a compressed air supply source 146 which is connected to the compressed air supply lines 141 to supply the compressed air while adjusting a supply amount of the compressed air by a supply valve 145.

In this case, the compressed air supply part 140 may include supply spray nozzles 143 having inclined spray portions 144 to face the compressed air toward the filters 124.

An effect of the filter dust collector having the above configuration according to the present invention will be described.

First, when air mixed with dust is introduced through the duct suction port 112 of the housing part 110, the air passes through the filters 124 having the filter cloths 123 in the housing and the dust-filtered air is supplied to the supply port 113.

In this case, the supply amount of the filtered air supplied to the supply port 113 is adjusted by operating the supply controller 114 coupled to the supply hinge 115 inside the supply port 113.

While the filtered air is supplied to the supply port 113, the dust filtered by the filters 124 is accumulated in the housing 111, and the accumulated dust is discharged through the dust discharge port 116 while a dust discharge amount is adjusted by the dust discharge valve 117 at a lower portion of the housing 111.

As described above, when the dust is accumulated in the filter cloths 123 of the filters 124 while the filtration is performed by the filters 124 along with supply of air, the supply valve 145 is operated such that air is supplied from the compressed air supply source 146. Accordingly, compressed air is supplied to the compressed air supply lines 141 and the compressed air supplied to the compressed air supply lines 141 is sprayed toward the filter cloths 123 through the compressed air supply holes 142.

Meanwhile, the supply spray nozzles 143 having the inclined spray portions 144 may be inserted into the compressed air supply holes 142. The supply spray nozzles 143 face the compressed air toward the filter cloths 123, thereby improving spray efficiency.

While the compressed air is sprayed toward the filter cloths 123, the rotation connection member 132 and the transfer shafts 133 are rotated according to the operation of the transfer motor 131. Accordingly, the transfer members 135 coupled to the filter bodies 121 are vertically operated.

In this case, a vertical transfer direction of the transfer members 135 is determined by a rotation direction of the transfer motor 131 coupled to the rotation connection member 132. Accordingly, the transfer members 135 are moved upward or downward according to the rotation direction of the transfer motor 131.

Further, the driven shafts 136 coupled to the driven support members 137 are disposed at lower portions of the transfer members 135. The driven shafts 136 support the transfer members 135 such that the transfer members 135 are rotated and vertically transferred.

As described above, as the transfer members 135 are vertically moved according to the rotation, the filter bodies 121, which are fixed to the transfer members 135 by the transfer fixing portions 125 coupled to the respective edges of the filter bodies 121, are vertically moved. At the same time, the compressed air is supplied toward the filter cloths 123 of the filters 124 to remove the dust.

In this case, the housing part 110 may further include the transfer detection sensor 118 which is disposed inside the housing 111 to detect vertical transfer of the filter bodies 121. The transfer detection sensor 118 detects positions of the filter bodies 121 vertically transferred by the transfer part 130 such that the filter bodies 121 can move to certain positions. That is, it is possible to prevent the filter bodies 121 from being separated from the filter cloths 123. The transfer detection sensor 118 may transmit position information of the filter bodies 121 to an external monitor (not shown) or the like.

Further, the compressed air is supplied in the same direction as the supply direction of the air mixed with dust supplied from the duct suction port 112. Accordingly, the dust is removed by strong pressure of the compressed air without disturbing flow of air, thereby minimizing resistance of air.

Chains are used as the transfer members 135 and the chains are connected to sprockets.

Figure 7:
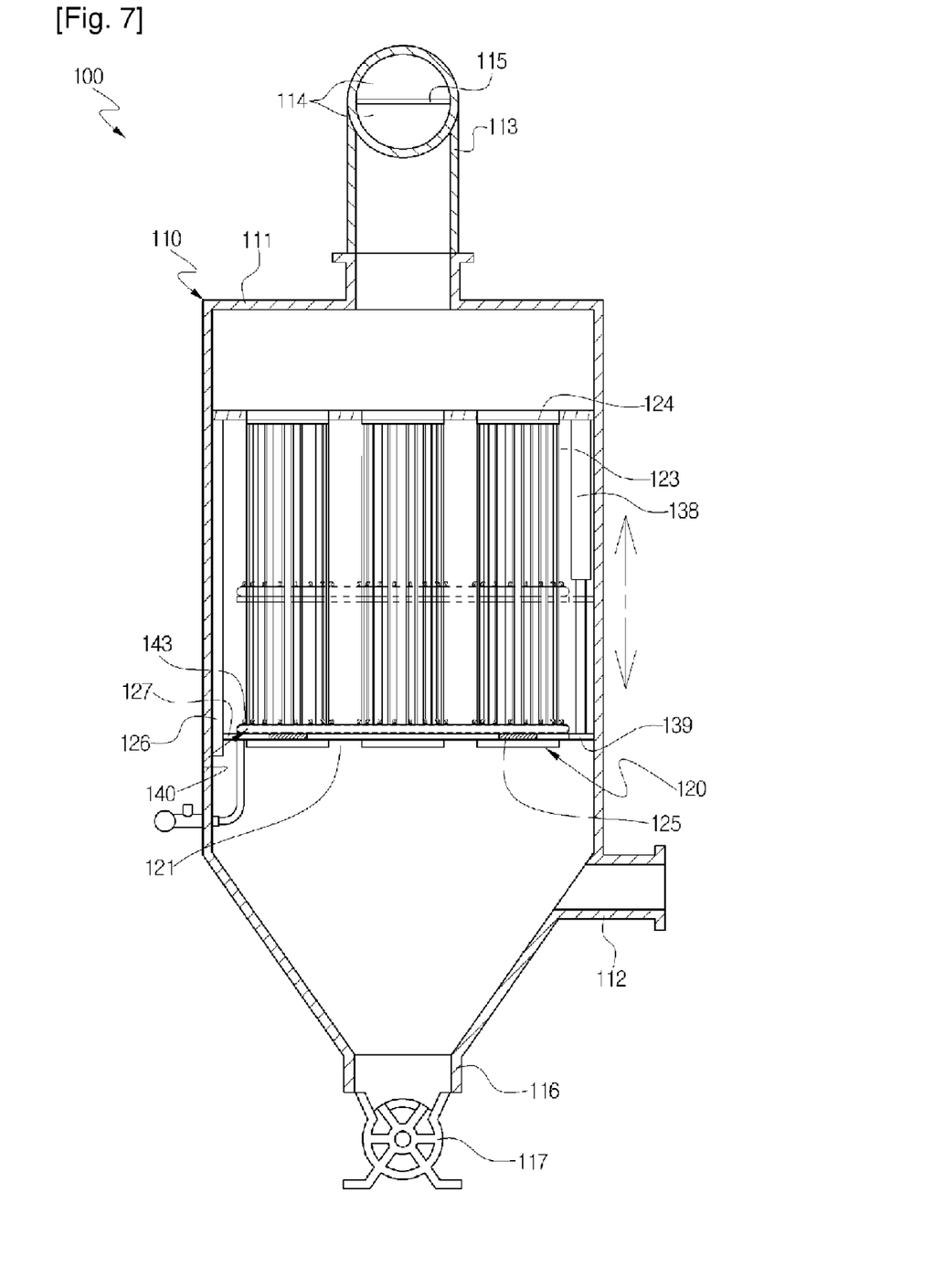
FIG. 7 illustrates a cross-sectional view showing a filter dust collector according to another embodiment of the present invention.

Next, another embodiment of the present invention will be described with reference to FIG. 7. FIG. 7 illustrates a cross-sectional view showing a filter dust collector according to another embodiment of the present invention.

Referring to FIG. 7, the cylinder fixing part 139, which is protruded toward the inner surface of the housing 111, is installed at one side of the filter bodies 121.

The transfer cylinder 138 is installed such that one end of the transfer cylinder 138 is fixed to the cylinder fixing part 139 and the other end of the transfer cylinder 138 is fixed to a position inside the housing 111, thereby transferring the filter bodies 121 in a longitudinal direction.

When the transfer cylinder 138 is operated, the filter bodies 121 fixed to the cylinder fixing part 139 are transferred in a longitudinal direction.

In this case, the guide seating portion 127 is installed at a position inside the housing 111, which is connected to the other side of the filter bodies 121.

Further, the guide 126 is protrudingly formed at the other side of the filter bodies 121. The guide 126 is seated on the guide seating portion 127 to guide the filter bodies 121 when the filter bodies 121 are transferred in a longitudinal direction.

Accordingly, the filter bodies 121 are vertically moved by the operation of the transfer cylinder 138 while the filter bodies 121 are guided by the guide 126 inserted to the guide seating portion 127.

The compressed air supply lines 141 (see FIG. 3) are disposed at the filter insertion holes 122 (see FIG. 3) into which the filters 124 are inserted to spray the compressed air through the supply spray nozzles 143. Further, the supply spray nozzles 143 are vertically moved by the transfer part 130 to remove the dust. Consequently, air introduced through the duct suction port 112 is filtered and supplied toward the supply port 113 without interference with the flow of air while the dust is removed.

Figure 8:
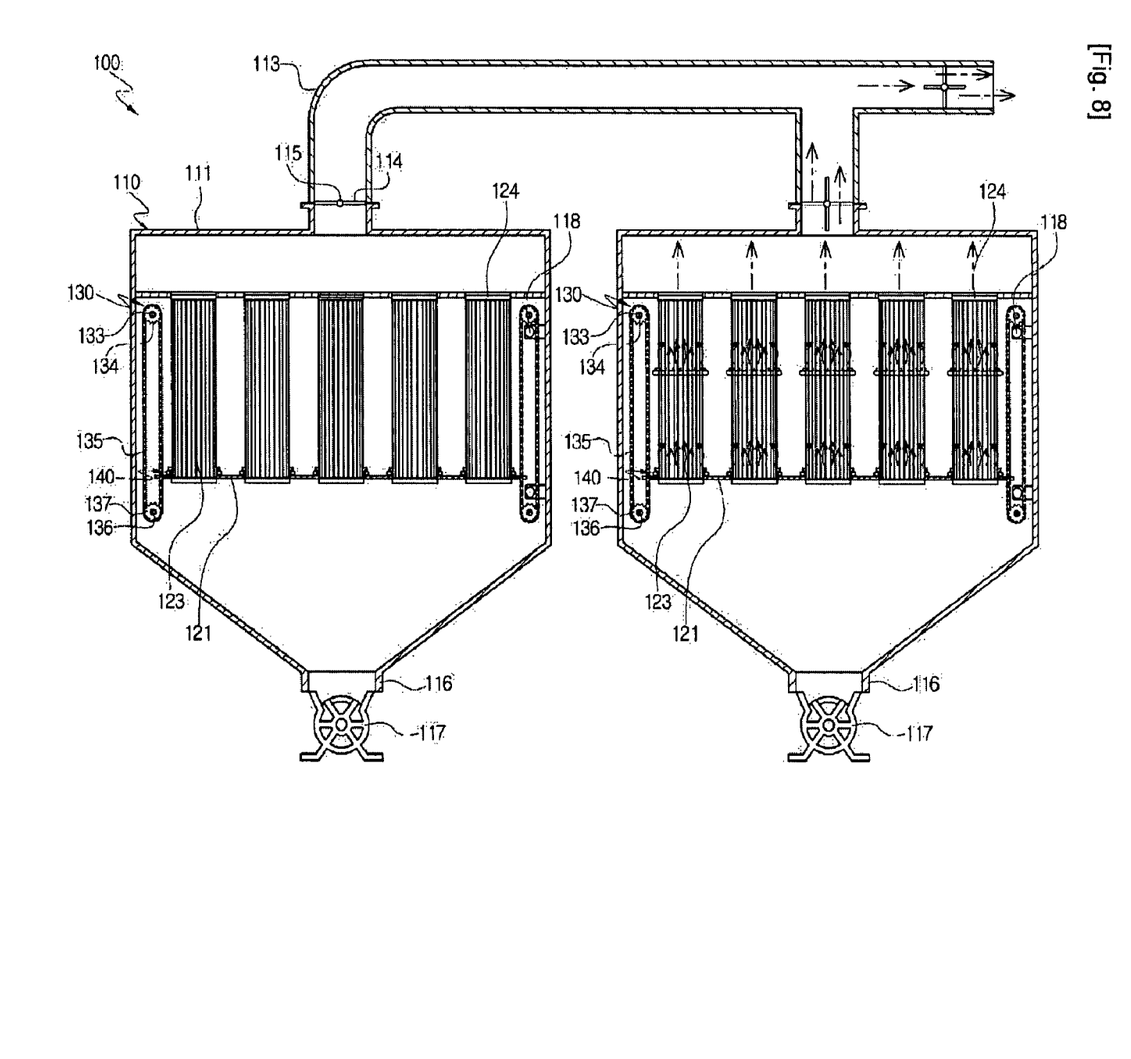
FIG. 8 illustrates a cross-sectional view showing a state in which a plurality of filter dust collectors having the same configuration as the filter dust collector shown in FIG. 1 are installed.

FIG. 8 illustrates a cross-sectional view showing a state in which a plurality of filter dust collectors having the same configuration as the filter dust collector shown in FIG. 1 are installed.

As shown in FIG. 8, in a case of installing a plurality of filter dust collectors 100, the supply ports 113 of the respective removal apparatuses 100 are coupled as a single body to supply air introduced through the duct suction ports 112 in a filtered state. If a lot of dust is accumulated in the housing 111 in any one of the filter dust collectors 100, the supply controller 114 thereof is closed. The supply controller 114 is operated with the supply hinge 115 of the supply port 113.

After the supply controller 114 is closed, the compressed air of the compressed air supply source 146 is supplied by operating the supply valve 145 without the flow of air in the housing 111 and is sprayed through the supply spray nozzles 143 of the compressed air supply lines 141. The filter bodies 121 inserted into the filter insertion holes 122 are vertically moved by the transfer part 130 while spraying the compressed air to remove the dust. The removed dust is discharged through the dust discharge port 116.

When the above-described dust removal operation is finished, refiltration is carried out while the supply controller 114 of the supply port 113 is operated and opened. Then, the supply controller 114 of another one of the filter dust collectors 100 in which a lot of dust is accumulated is closed to perform the dust removal operation. As described above, when the removal operation is conducted alternately in the filter dust collectors 100, it is possible to increase dust removal efficiency of the filter dust collectors 100.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

According to the filter dust collector in accordance with the embodiment of the present invention, since there is no interference in the filtration flow, it is possible to improve a filtration amount even without an increase in facilities. Thus, it is possible to reduce the manufacturing costs of the filter dust collector.

The invention claimed is:

1. A filter dust collector comprising:
a housing part which includes a housing, a supply port formed at an upper portion of the housing, a duct suction port formed on a side surface of the housing to suck air to be filtered, and a dust discharge port formed at a lower portion of the housing and having a dust discharge valve;
a filter body part which includes filter bodies formed inside the housing and having filter insertion holes, transfer fixing portions formed on edges of the filter bodies, and filters inserted into the filter insertion holes and having filter cloths;
a transfer part which includes transfer members coupled to the transfer fixing portions and transferred vertically, transfer shafts having transmission members rotatably coupled to the transfer members, driven shafts having driven support members coupled to the transfer members, and a transfer motor for rotating the transfer shafts; and
a compressed air supply part formed at peripheries of the filter insertion holes to spray compressed air.

2. The filter dust collector according to claim 1, wherein the compressed air supply part includes:
compressed air supply lines formed at the peripheries of the filter insertion holes and having compressed air supply holes; and
a compressed air supply source which supplies compressed air to the compressed air supply lines.

3. The filter dust collector according to claim 2, further comprising supply spray nozzles installed at the compressed air supply holes and having inclined spray portions to adjust a spray position of the compressed air.

4. The filter dust collector according to claim 3, wherein the supply port includes a supply controller which is disposed inside the supply port to adjust a discharge amount of filtered air, and the supply controller is rotated to adjust the discharge amount of air by hinge coupling.

5. The filter dust collector according to claim 1, further comprising a transfer detection sensor which is disposed inside the housing to detect vertical transfer of the filter bodies.

6. A filter dust collector comprising:
a housing;
filter cloths fixed to an inside of the housing;
a filter body part disposed inside the housing and having filter insertion holes;
a compressed air supply part coupled to peripheries of the filter insertion holes;
a transfer part connected to the filter body part to move the filter body part and the compressed air supply part in a longitudinal direction;
a duct suction port formed on a side surface of the housing to suck air to be filtered;
a supply port formed on a side surface of the housing to discharge filtered air; and
a dust discharge port formed on a side surface of the housing,
wherein the filter cloths are positioned at the filter insertion holes, the filter body part and the compressed air supply part move in the longitudinal direction, and
the compressed air supply part sprays compressed air to the filter cloths.

7. The filter dust collector according to claim 6, wherein the transfer part includes:
chains connected to the filter body part;
transfer shafts connected to the chains; and
a transfer motor which rotates the transfer shafts.

8. The filter dust collector according to claim 6, wherein the transfer part includes:
a cylinder fixing part formed on one surface of the filter body part and protruded toward an inner surface of the housing; and
a transfer cylinder having one side fixed to the cylinder fixing part and the other side fixed to the inside of the housing to move the filter body part in a longitudinal direction.

9. The filter dust collector according to claim 8, further comprising:
a guide seating portion which is installed on the inner surface of the housing toward the other surface of the filter body part in the longitudinal direction; and
a guide which is formed on the other surface of the filter body part to be protruded toward the inner surface of the housing and is seated on the guide seating portion to guide movement of the filter body part.

* * * * *